Inventor.
Archibald G. F. Marriott
By Connolly Bros
Attorney

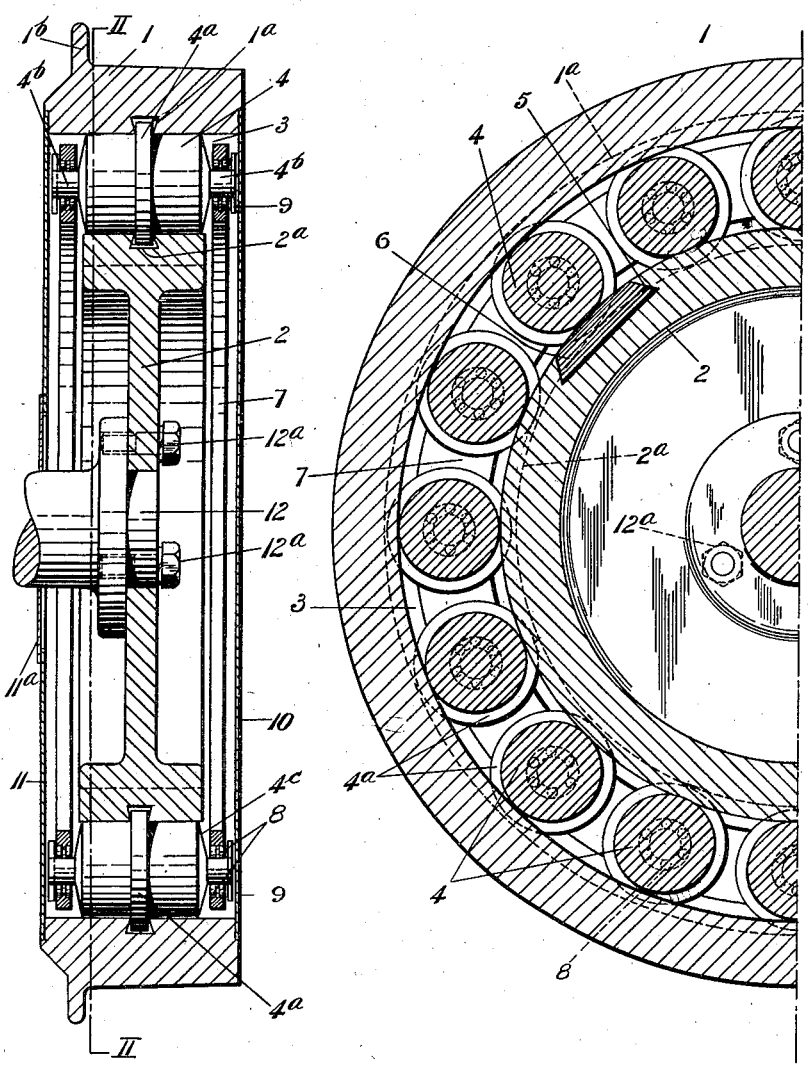

Patented Jan. 19, 1937

2,068,240

UNITED STATES PATENT OFFICE 2,068,240

WHEEL, MORE PARTICULARLY FOR VEHICLES

Archibald George Frederick Marriott, Loughborough, England

Application January 21, 1936, Serial No. 60,099
In Great Britain March 12, 1935

10 Claims. (Cl. 295—10)

This invention relates to wheels of the kind adapted to run along a track or rotate in contact with a relatively moving surface or surfaces and is applicable more especially to locomotive railway carriage, wagon and similar types of wheels but may also be applied to wheels for road and other vehicles, and wheels for machinery, e. g. mixing machines for road work and other portable plant.

The object of the invention is to improve the construction of wheels of the kind aforesaid with a view to reducing bearing friction to a minimum.

In the accompanying drawings:

Figure 1 is a transverse sectional view of a railway wagon or carriage wheel constructed according to this invention.

Figure 2 is a half-sectional view of the same on the line II—II of the Figure 1.

Like parts are designated by similar reference characters throughout the drawings.

Figure 3:
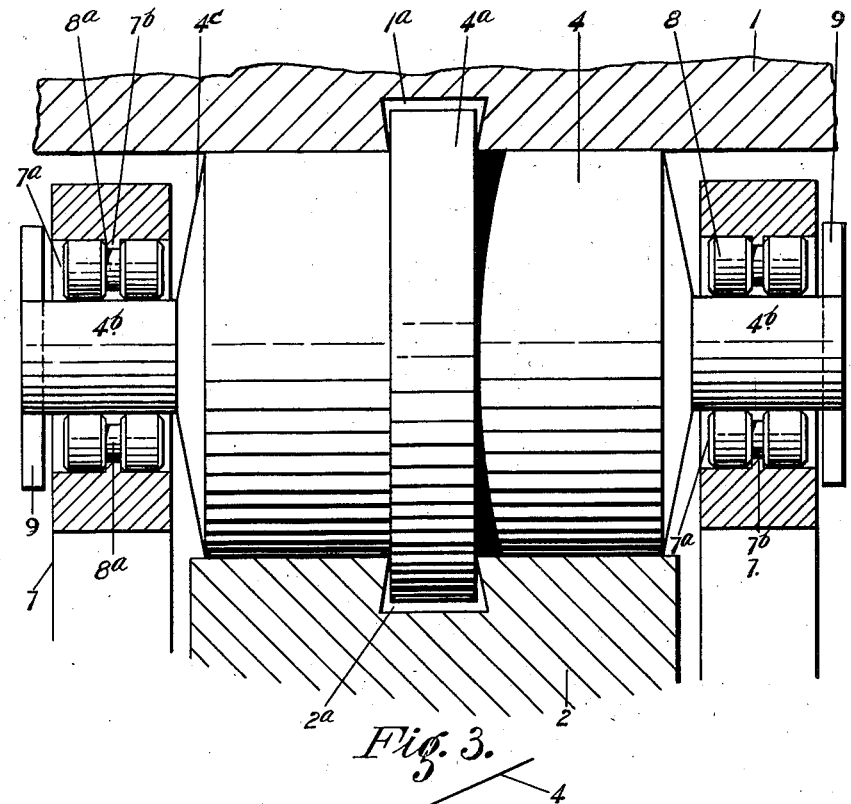
Figure 3 is a detail sectional view on a larger scale representing one of a circular series of rollers mounted in spacing plates and interposed between the rim or an outer portion and a main or middle part of the wheel.

Referring to the drawings, the flanged rim of the wheel 1 is made separately as an annular member and has an internal diameter larger than the external diameter of the middle part 2 of the wheel so that when the latter is positioned concentrically within the former there is an annular space 3 between the two. Between the said parts i. e. in the aforesaid annular space 3, there is arranged a circular series of rollers 4 each of which is of parallel form. As will be seen from Figure 2, there is an even number of rollers in this series so as to maintain the balance of the wheel during rotation. The rollers 4, moreover, are spaced apart and disposed transversely and the opposing faces of the two parts i. e. the periphery of the inner wheel part 2 and the internal face of the annular rim 1 are suitably formed to constitute bearing surfaces upon which the rollers can travel by rolling contact. In this way each roller 4 in the series has no more than line contact with the opposing surfaces of the two parts of the wheel that is contact on a peripheral line parallel to the axis of the roller and consequently the annular rim can revolve upon the middle part of the wheel with a minimum amount of friction.

In order to prevent endwise displacement of the rollers 4 and also to prevent lateral relative displacement or movement of the outer and inner wheel parts 1 and 2 due to side thrust, said rollers each have a circumferential flange 4a preferably disposed in the middle, and the inner face of the rim 1 and outer face of the middle part 2 of the wheel are circumferentially grooved at 1a and 2a respectively in an appropriate manner to receive the said flange of the rollers. The said grooves 1a and 2a in the wheel parts are as shown dovetailed in cross section or undercut at the sides and the roller flanges 4a are parallel-sided so as to obviate flat facial and consequently frictional contact between the flanges and sides of the grooves as the flanges rotate along the grooves and the rollers roll round the annular space 3. The contact between the flanges 4a and the beveled undercut, or dove-tailed grooves 1a and 2a herein termed "a point contact" to distinguish it from a line contact between the peripheries of the rollers and the opposing surfaces and a flat surface contact between the sides of the flanges and the opposite surfaces of the grooves. It is therefore to be understood that the terms "point contact or edge contact" herein used indicate that the contact between the roller flanges and the sides of the grooves is a contact of a beveled edge with a flat surface whereby friction between the parts in contact is reduced to a minimum. The flanges 4a on the rollers are made of such diameter as will prevent their peripheries touching the bottoms of the grooves 1a and 2a, whereby the bearing pressure of the rim or outer portion of the wheel is taken wholly by the parts of the rollers adjacent the flanges.

As will be readily appreciated, the flanges 4a in addition to guiding the rollers 4, ensure that the latter remain square in their action and consequently make uniform contact with the inner face of the rim 1 and the outer face of the middle part 2 of the wheel.

In order to permit the flanged rollers 4 to be introduced and positioned between the inner and outer parts of the wheel during assembly, the inner part 2 as seen in Figure 2 has a transverse slot or gap 5 formed in its periphery this being of shape and dimensions suitable to admit the rollers endwise into itself and the adjacent part of the annular space 3 and so that their flanges 4a can be introduced into the groove 1a of the rim. After all the rollers have been put in, the slot or gap 5 is filled by a suitably shaped block or other filling piece 6. Conveniently and as shown the transverse slot or gap 5 is of dovetail cross section and the filling piece, which is of corresponding cross section, is inserted endwise into position and secured in any suitable manner. The block or filling piece 6 has an outer face appropriately made to form, when in place, a continuation of the grooved periphery of the middle part of the wheel so that this presents a complete bearing surface for the rollers 4 to roll upon.

Figure 4:
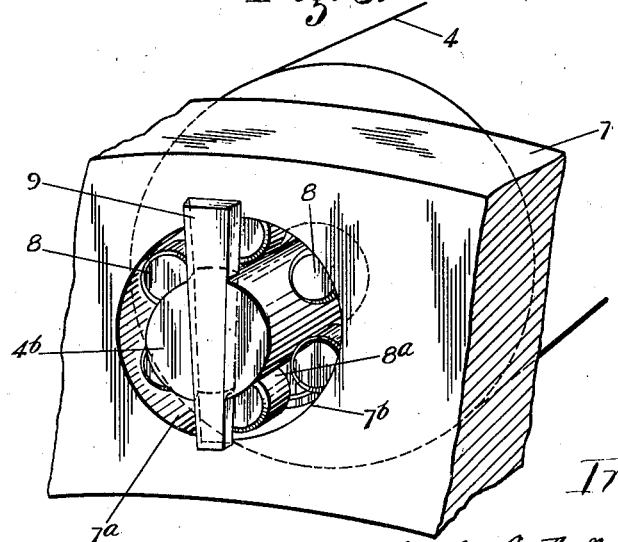
Figure 4 is a detail perspective view illustrating a method of mounting the rollers in the spacing plates and the means employed to retain said plates in position.

The said rollers have reduced ends 4b forming journals and are spaced apart to prevent contact friction therebetween around the annular space 3 by circular spacing plates 7 of which there are two, one on each side of the wheel. These plates have holes 7a at intervals apart into which the reduced ends of the rollers project. One of these holes 7a is shown more clearly in Figure 4. The said holes are made of larger diameter than the journals 4b of the rollers and in the spaces thus formed small rollers 8 are positioned in circular series to serve as anti-friction means between the rollers 4 and the spacing plates 7. These small rollers are disposed with their axes parallel to the axes of the main rollers and are parallel in form. To prevent their displacement endwise, the small rollers may, as shown in Figures 3 and 4, be circumferentially grooved, the said grooves 8a engaging a flange 7b projecting either on the inside of the holes 7a as shown, or on the outside of journals 4b. As will be observed, the sides of the flange 7b and the sides of the grooves 8a are so formed as to obviate as much as possible friction between the flange and the grooves.

The small rollers 8 in each hole 7a may be spaced around the journal 4b by any suitable means. As in the case of the main rollers 4, there is preferably an even number of small rollers in each series so as to maintain the balance of the wheel during rotation. In addition to guiding the rollers 8, the flanges 7b ensure the said rollers remain square in their action and consequently make uniform line contact with the inner faces of the holes 7a and the outside of the journals 4b.

In order to retain the spacing plates 7 in position, a series of pegs or keys 9 associated with the ends of the journals 4b is preferably provided. As illustrated in Figure 4, each peg or key of the series, in addition to being tapered longitudinally, is of dovetail shape in cross section and is adapted to engage a correspondingly formed diametral slot in the ends of a journal 4b.

The journals and bearings in the spacing plates may be simple or ordinary, if so desired. The shoulder faces 4c of the main rollers between the middle part and reduced ends 4b are bevelled or inclined to obviate flat facial and consequently frictional contact with the insides of the spacing plates 7.

It is to be clearly understood that the journals 4b and bearings 8 need not necessarily take the form above described as plain or ordinary journals and bearings may be provided if desired.

The revoluble rim or outer part 1 of the wheel is preferably wider than the middle part 2 and is arranged so as to extend beyond said middle part on each side as shown in Figure 1. The main rollers 4 are of such length from end to end that they and their associated spacing plates 7 come within the width of the rim. To each side of the rim there is attached a plate or flat ring which serves to cover the roller ends and spacing plates. These side cover plates or rings may be of suitable dimensions to close the sides of the wheel wholly or partially. For instance, the cover plate 10 on the outside of the wheel may be a disc to close this side completely while on the other side the cover plate 11 may consist of a flat ring the central hole 11a in which permits passage therethrough of the axle 12 to which the middle part of the wheel is attached. By such cover plates the wheel is made to entirely enclose the middle part, roller and associated parts. The side cover plates or rings may be made in sections if desired.

As shown, the revoluble rim 1 is recessed on each side to receive the cover plates 10 and 11 which are fixed therein so as to make an oil-tight joint. This enables the space between the side cover plates to be utilized to contain oil or/and grease for lubricating, by centrifugal action, the moving parts between the rim and middle part 2 of the wheel.

To obviate friction the side cover plates or rings 10 and 11 may be spaced from the spacing plates 7 on the inside. Instead of the main rollers 4 being flanged as described they may be circumferentially grooved to engage with a flange on the rim or middle part 2 or on both of such parts. Also, instead of the smaller rollers 8 being grooved they may be circumferentially flanged to engage with grooves in the holes and/or in the journals 4b.

As is customary in railway carriage and similar types of wheel, the rim 1 is provided with an external flange 1b which latter in this case is preferably disposed so that the rollers 4 take up a position immediately above the rail on which the wheel runs. Moreover, in order to prevent the wheel from inadvertently coming into contact with projecting parts of the sleepers of the rails, the depth of the inner face of the flange 1b may be increased, as shown, and the rim bevelled at this point.

The relative proportions of the wheel may vary according to the purpose for which it is to be used and also according to its size, but it is believed that in most cases it will be advantageous to proportion the rim and middle parts 1 and 2 so that the circular series of main rollers 4 will be situated nearer to the outer periphery of the wheel than to the centre. For example, the diameter of the said circular series may be about or greater than two thirds of the diameter of the wheel. The invention is not, however, limited in this respect as in some cases the said circular series may be of less proportional diameter.

In one constructional example suitable for a railway wagon wheel of 3 ft. diameter outside the rim, the main rollers are 3½ inches diameter and arranged in a circular series of about 2 ft. 2 inches centre line diameter between the rim and middle part of the wheel.

An anti-friction wheel constructed as herein described provides the advantage that it can be carried by a fixed i. e. non-rotary axle. In such case the middle part 2 of the wheel, which may be spigotted on to or otherwise applied and secured as by bolts 12a to the fixed axle 12, is non-rotatable and the rim 1 revolves on said middle part by means of the interposed anti-friction elements. It is primarily intended that the middle part of the wheel shall be non-rotational but it may if desired be mounted or applied so as to be capable of rotation, for example it may be capable of rotation under the influence of the rim but at a slower speed.

Moreover, a railway wagon wheel constructed as herein described provides the advantage that the size of the antifriction means, i. e. the main rollers 4, may be made considerably larger than in the case of a wheel ordinarily mounted by means of a roller bearing. As will be readily appreciated, this enables the said anti-friction means to withstand to a greater extent the weight and/or pressure to which they are subjected. The increased size of the rollers together with bearing surfaces of increased diameter also results in a reduction of the bearing friction and also of the distortion of the wheel, particularly when the latter is rounding a bend at speed.

Whilst in the wheel illustrated sixteen main rollers and eight small rollers are provided it will of course be understood that any desired number of main or small rollers may be used.

What I claim now is:—

1. A wheel of the kind specified, comprising a middle part, an outer part which is circumferentially movable relatively to said middle part, a number of rollers disposed transversely in an annular series between the two parts, each of said rollers being adapted to make peripheral line contact with the opposing surfaces of the wheel parts, and means for providing edge contact between each roller and the wheel parts laterally, whereby said rollers are prevented from being displaced axially and are maintained square in their action and the area of frictional resistance between opposing relatively movable parts substantially reduced.

2. A wheel of the kind specified, comprising a middle part, a rim which is circumferentially movable relatively to said middle part, the rim and the middle part being formed respectively with a circumferential groove which is undercut at the sides, and a number of rollers disposed transversely in an annular series between the wheel parts, each of said rollers being adapted to make peripheral line contact with the opposing surfaces of said parts and having a parallel-sided flange adapted to engage and rotate along the grooves aforesaid in edge contact with the opposing sides of the groove, the arrangement being such that there is a clearance between the flanges and the bottoms of the grooves.

3. A wheel of the kind specified comprising a middle part, an outer part which is circumferentially movable relatively to said middle part, a number of rollers disposed transversely in an annular series between the two parts, each of said rollers being adapted to make line contact with the opposing surfaces of the wheel parts, means for providing edge contact between each roller and the wheel parts laterally, whereby said rollers are prevented from being displaced axially and are maintained square in their action, and means for spacing the rollers circumferentially.

4. A wheel of the kind specified, comprising a middle part, an outer part which is circumferentially movable relatively to said middle part, a number of rollers disposed transversely in an annular series between the two parts, each of said rollers being adapted to make line contact with the opposing surfaces of the wheel parts, means for providing edge contact between each roller and the wheel parts laterally, whereby said rollers are prevented from being displaced axially and are maintained square in their action, spacing means for spacing the rollers circumferentially, and a series of auxiliary anti-friction elements interposed between parts of the rollers and the spacing means.

5. A wheel of the kind specified, comprising a middle part, an outer part which is circumferentially movable relatively to said middle part, a number of rollers disposed transversely in an annular series between the two parts, each of said rollers being adapted to make line contact with the opposing surfaces of the wheel parts, and having reduced ends forming journals, means for providing edge contact between each roller and the wheel parts laterally whereby said rollers are prevented from being displaced axially and are maintained square in their action, and spacing plates having holes at intervals apart into which the reduced ends of the rollers project.

6. A wheel of the kind specified, comprising a middle part, an outer part which is circumferentially movable relatively to said middle part, a number of rollers disposed transversely in an annular series between the two parts, each of said rollers being adapted to make line contact with the opposing surfaces of the wheel parts, and having reduced ends forming journals, means for providing beveled edge contact between each roller and the wheel parts laterally whereby said rollers are prevented from being displaced axially and are maintained square in their action, spacing plates having holes at intervals apart into which the reduced ends of the rollers project, the holes being of larger diameter than the said reduced ends, and a plurality of anti-friction elements arranged in circular series and interposed between the reduced ends of the rollers and the spacing plates.

7. A wheel of the kind specified, comprising a middle part having a transverse gap formed in its periphery, a rim which is circumferentially movable relatively to said middle part, the rim and the middle part being formed respectively with a circumferential groove which is undercut at the sides, a number of rollers, which, after being admitted endwise into the transverse gap in the middle part are disposed transversely in an annular series between the wheel parts, each of said rollers being adapted to make line contact with the opposing surfaces of said parts and having a parallel-sided flange adapted to engage and rotate along the grooves aforesaid, there being a clearance between the flanges and the bottoms of the grooves, and a filling block adapted to fill the transverse gap in the middle part of the wheel when the rollers have been positioned.

8. A wheel of the kind specified comprising a middle part, an outer part which is circumferentially movable relatively to said middle part, a number of main rollers disposed transversely in an annular series between the two parts, each of said rollers being adapted to make line contact with the opposing surfaces of the wheel parts and having reduced ends forming journals, means for providing edge contact between each main roller and the wheel parts laterally whereby said rollers are prevented from being displaced axially and are maintained square in their action, spacing plates having holes at intervals apart into which the reduced ends of the rollers project, the holes being of larger diameter than the said reduced ends, a plurality of small rollers arranged in circular series and interposed between the reduced ends of the main rollers and the spacing plates, and means for providing point contact between each of the small rollers and the spacing plates laterally, whereby said small rollers are prevented from being displaced axially and are maintained square in their action.

9. A wheel of the kind specified, comprising a middle part, an outer part which is circumferentially movable relatively to said middle part, a number of rollers disposed transversely in an annular series between the two parts, each of said rollers being adapted to make peripheral line contact with the opposing surfaces of the wheel parts, and having reduced ends forming journals, means for providing edge contact between each roller and the wheel parts laterally whereby said rollers are prevented from being displaced axially and are maintained square in their action, spacing plates having holes at intervals apart into which the reduced ends of the rollers project, there being one spacing plate on each side of the wheel, and, in association with the reduced ends of the rollers, a series of pegs adapted to retain the spacing plate in position.

10. A wheel of the kind specified, comprising a middle part, an outer part which is wider than and is circumferentially movable relatively to said middle part, a number of rollers disposed transversely in an annular series between the two parts, each of said rollers being adapted to make line contact with the opposing surfaces of the wheel parts, means for providing edge contact between each roller and the wheel parts laterally whereby said rollers are prevented from being displaced axially and are maintained square in their action, means for spacing the rollers circumferentially, said rollers and said spacing means both coming within the width of the outer part of the wheel, and side cover plates adapted to close the sides of the wheel.

ARCHIBALD GEORGE
FREDERICK MARRIOTT.